Oct. 26, 1937.  P. DALTON  2,097,116
PLOTTING AND COMPUTING DEVICE
Filed June 30, 1936  3 Sheets-Sheet 1
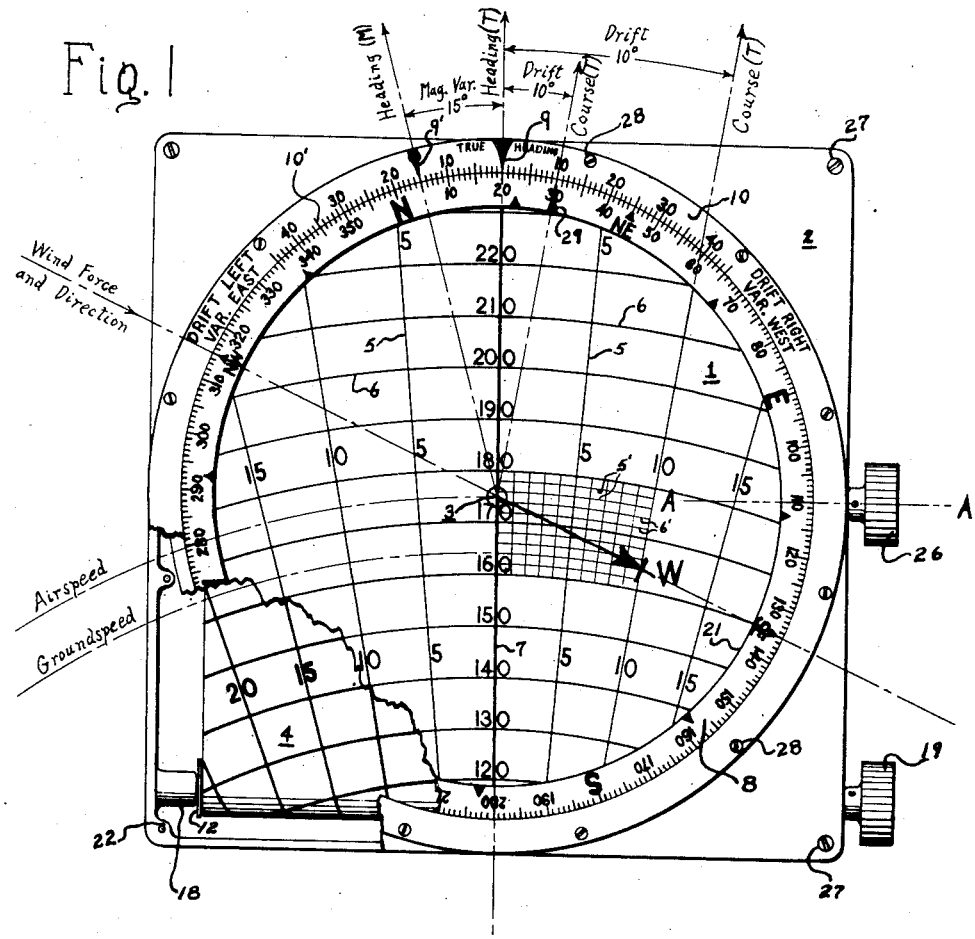
PHILIP DALTON, Inventor

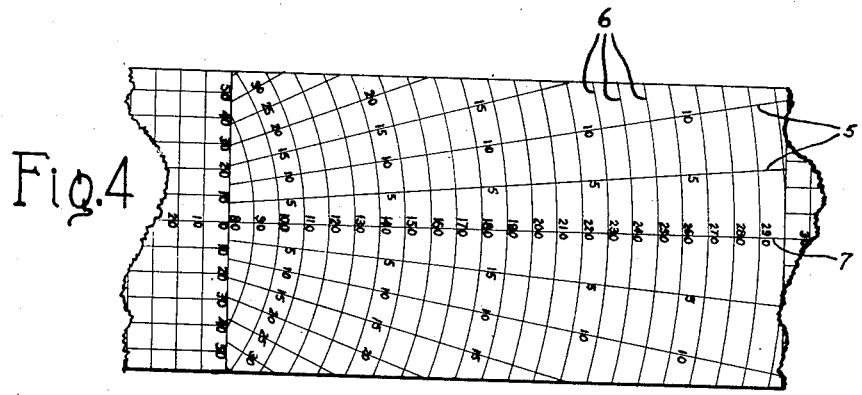

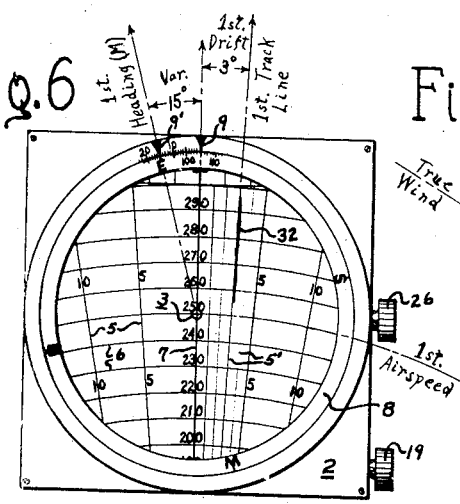
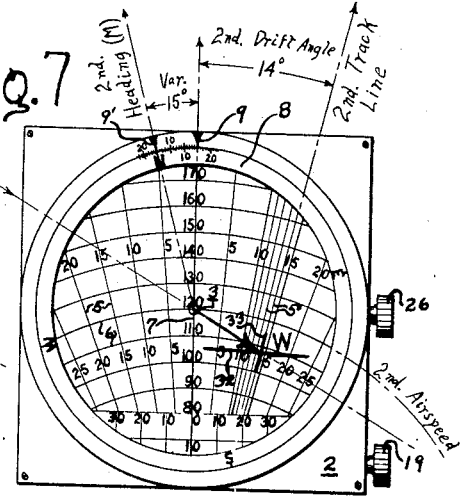
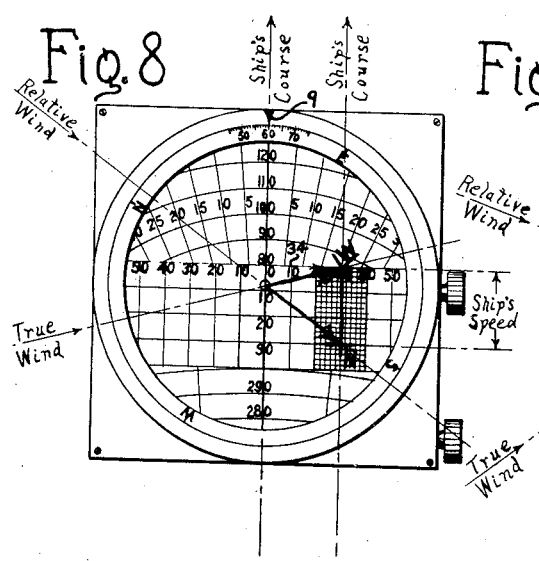
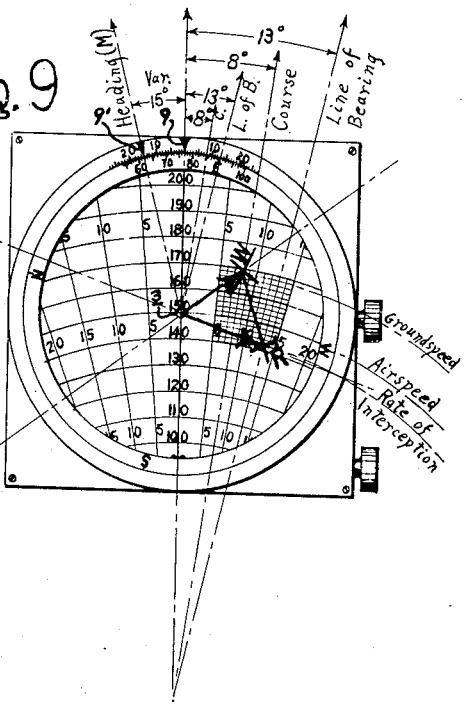

Patented Oct. 26, 1937

2,097,116

UNITED STATES PATENT OFFICE 2,097,116

PLOTTING AND COMPUTING DEVICE

Philip Dalton, Washington, D. C.

Application June 30, 1936, Serial No. 88,223

21 Claims.  (Cl. 33—1)

My invention relates to devices for solving problems in plane geometry and more particularly to computing devices which are applicable for use in solving problems in aerial navigation.

In the navigation of highspeed aircraft, the solution of various problems must be accomplished quickly, accurately and with the fewest mental calculations and manual operations possible. In single seater aircraft it is necessary that the pilot keep one hand on the controls and perform all of the navigational plotting with the other hand. This requires the use of a computing instrument which may be operated to solve the necessary problems with the utmost ease and speed, and which is very compact in structure. Furthermore, it is desirable to employ, for the purpose stated, an instrument which is extremely light in weight, which may be easily and cheaply manufactured, and which is of rugged and durable construction.

The art of aerial dead reckoning centers around the ability of the navigator to determine the force and direction of the wind and to apply such wind data as is obtainable to correct his course and speed. Furthermore, as the wind changes with time, place, and altitude, every opportunity should be taken to check or correct wind data. In flight, the heading and airspeed are generally accurately known. If the track and groundspeed can also be observed or computed, the force and direction of the wind can be found by the solution of a triangle of velocities. Or if the drift angle can be determined on two different headings, at the same or different airspeeds, the wind can be found by the well known double-drift method. Similarly, the wind can be found by plotting the groundspeeds on two different headings. As a pilot flies in and out of clouds, over lighted cities, past radio beacons, etc., various of these wind data become available from time to time.

It is, therefore, an object of my invention to provide improved means which may easily be operated to graphically record and visually correlate all such wind data as can be obtained, as well as to continuously correct the same and apply the results obtained thereby to enable one to navigate aircraft by dead reckoning.

A further object of my invention is to provide an improved graphical computing device having plotting lines, scales and indices and means to permit marking of indices, so arranged that magnetic variations, magnetic headings, true headings, drift angles, courses, true wind directions, true wind speeds, airspeeds, groundspeeds, carriers' courses, carriers' speeds, relative wind directions, relative wind speeds, collision bearings, rates of interception, and other vector quantities, can all be directly applied thereto and read therefrom to solve the velocity triangles involved in navigation without the necessity for any arithmetical computations whatever.

An additional object of my invention is to provide an improved aerial navigation instrument for graphically solving all types of wind triangles on a suitably large scale, the maximum dimensions of the instrument being much less, with reference to the scale of graphical solution, than the lengths of the groundspeed and airspeed vectors involved.

Another object of my invention is to provide an improved self-contained instrument of the above-stated character which may be used to solve various navigational problems with a minimum of mental calculation, which is extremely small in size, which, when fastened in the cockpit of a plane or on the operator's knee, is easily operated with one hand, and which is of cheap and rugged construction.

A still further object of my invention is to provide an instrument having the above features of construction and operation which includes an improved mechanical arrangement of its component parts.

Briefly, the above objects are attained in accordance with the present invention by providing a navigational instrument which comprises a section of a polar coordinate chart and a section of a rectangular coordinate chart on the same scale, the two sections forming a rectangular strip arranged for translatory motion along its centerline under a transparent plotting disc rotatably mounted with its center of rotation over the center line of the rectangular strip and with one of the radial lines of the polar coordinate chart and one of the parallel lines of the rectangular coordinate chart coincident with the center line of the strip. The other radial lines of the polar coordinate chart are labeled with scales of degrees right and left of the centerline, and the circles of the polar coordinate chart are labeled with a scale along the centerline, showing their distances from the origin of the polar coordinate chart, and coact with a speed index at the center of rotation of the transparent plotting disc. A compass rose carried by the rotatable transparent plotting disc coacts with a true heading index and a drift and variation scale mounted adjacent thereto on the frame of the instrument. Suitable mechanical means are provided for setting any desired circle or crossline of the charts under the center of rotation of the transparent plotting disc and for setting the plotting disc in desired angular orientation with respect to the centerline of the charts.

The novel features which I believe to be characteristic of my invention are set forth with particularity in the appended claims. My invention itself, however, both as to its organization and the method of operation, together with further objects and advantages thereof, will be best understood by a reference to the specification taken in connection with the accompanying drawings, in which: Fig. 1 is a top view, partly broken away, illustrating an embodiment of my invention; Fig. 2 is a side view, partially in section, illustrating certain details of the device shown in Fig. 1; Fig. 3 is a detailed sectional view taken along the line A—A of Fig. 1; Fig. 4 is a plan view of one of the elements of Fig. 1; Fig. 5 is a view of the device superimposed over a conventional maneuvering board, of the same graphical scale and range, to show the relatively small size of this embodiment; Figs. 6 and 7 illustrate the use of the device to measure the force and direction of the wind by the well-known double-drift method; Fig. 8 illustrates the use of the device to measure the force and direction of the wind relative to a moving ship; and Fig. 9 illustrates the use of the device to solve the problem of intercepting a moving ship.

Referring more particularly to Figs. 1, 2, 3 and 4 of the drawings, there is illustrated an embodiment of my invention as comprising a transparent plotting disc or member 1 suitably mounted on a supporting frame 2 to permit rotation thereof about an axis 3 and positioned above a second member 4 also mounted on the frame 2, and upon which are delineated the polar coordinate radial lines 5 and arcs 6 of a polar coordinate chart. As shown, the radial lines 5 are labeled to indicate angular displacement for the purpose of indicating on the surface of the plotting disc the drift of an object as, for example, an airplane, which is affected in its movement by wind. The arcs 6 are suitably calibrated to measure speed; the distance from the coordinate chart origin, or the common center thereof to the respective arcs being proportional to speed. If desired, and for the purpose of further facilitating the use of the instrument, additional coordinate lines 5' and 6' may be interspersed between the major coordinate lines 5 and 6, respectively. An additional square coordinate, or grid chart shown at the left end of Fig. 4, is also delineated on the member 4. This chart includes lines extending, respectively, parallel and perpendicular to the center line 7 of the polar coordinate chart. The lines are spaced at intervals designed to indicate speed to the same scale as the spacing between the arcs 6 of the polar coordinate chart. This rectangular coordinate chart is useful in the solution of certain problems, as will be pointed out hereinafter.

The member 4 is arranged for translatory movement with respect to the plotting disc 1 in such manner that the center of rotation 3 of the disc 1 may be moved along an index or center line 7, which is one of the radial lines 5. Thus, the member 4 may be adjusted in such manner that the distance from the axis 3 to the origin (not shown) of the polar coordinate chart represents a vector which is proportional to air speed; the magnitude of this vector being determinable from the numerical indication identifying the desired arc 6 or 6'. In this manner the axis of rotation 3, marked by a dot and circle inscribed on the transparent disc 1, functions as a speed index.

For the purpose of properly setting the desired angular orientation of the plotting disc 1 with respect to the index line 7, a compass rose 8 is provided which may, if desired, be delineated on a circular ring 21 at the periphery of the disc 1 in the manner indicated. This compass rose is calibrated in degrees in the usual manner and cooperates with a true index 9 suitably positioned adjacent thereto on the supporting frame 2. Preferably, the index 9 is delineated on a circular ring 10 located in juxtaposition to the periphery of the compass rose ring 21 and having thereon a variation scale 10' graduated in the manner indicated to give angular measurement on either side of the index 9. The variation scale 10' extending on either side of the true index 9 is provided for pencil-marking an additional index such as 9' to serve as an index for magnetic bearings equivalent to the true bearings to be read at the true index 9. This index for magnetic bearings may be pencil-marked to the left or right of the index 9, and its position is determined by the number of degrees magnetic North varies East or West of true North for the locality in which it is desired to navigate. The scale 10' is also used to measure the drift angle in the solution of drift triangles, as hereinafter described.

Referring more particularly to Fig. 2 of the drawings, there is illustrated the mechanical arrangement whereby desired relative angular and translatory movement between the members 1 and 4 may be obtained. As shown, the member 4 comprises a rectangular strip having its ends connected to form an endless belt passing over a pair of rollers 11 and 12, respectively, which rollers are mounted within the supporting frame 2. It will be seen that the frame 2 comprises a box 13 within which the member 4 is mounted, and a cover 14 upon which the transparent plotting disc 1 is mounted. For the purpose of maintaining the belt taut to reduce parallax in plotting, the roller 11 is mounted on floating bearing members 15 which extend within tubular members 16 and which are biased by compression springs 17 in a direction to move the roller 11 away from the roller 12. The tubular members 16 are fixedly mounted within the box 13 along the inner walls of opposite sides thereof. Bearing members 18, extending inwardly from opposite sides of the box 13, contain the bearing surfaces for the roller 12.

In order to move the surface of the belt around the rollers, to alter the location of the axis 3 along the index line 7 and thereby change the setting of the axis 3 over the desired speed arc or grid chart coordinant line, the shaft for the roller 12 is provided with an extension which projects outside of the walls of the box 13 and upon which is mounted a knob 19. As thus arranged, rotation of the knob 19 causes movement of the belt around the rollers to change the upper area thereof lying beneath the plotting disc 1.

The details of the plotting disc assembly will best be understood by reference to Fig. 3 wherein it will be seen that the beveled edge of the transparent plotting disc 1 may be clamped in place in the supporting ring 21 by means of a retaining ring 20 screwed or pressed into a circular groove in the under side of ring 21. Ring 21 in turn may be mounted for rotation in a circular aperture in the box cover 14. This aperture in the cover 14, which is not shown except in cross section in Figs. 2 and 3, is of the same diameter as the inner edge of ring 10. Ring 10 is partially cut away on its under side to leave a circular groove in which the flange 21a of ring 21 can freely slide when the unit is assembled. The unit is assembled by fastening the ring 10 to the cover 14 with screws 28.

The plotting disc supporting ring 21 is also provided with a flange projecting downwardly therefrom, which flange is toothed, as indicated at 23. As shown, the teeth 23 mesh with the teeth of a spur gear 24, mounted on a shaft 25 extending through a bearing provided in one wall of the box 13 and having mounted thereon a knob 26. It will be understood that rotation of the knob 26 causes the plotting disc assembly to be rotated about the axis 3 due to the coaction between the spur gear 24 and the teeth 23 and the sliding action between the flanged ring 21 and the circular bearing surfaces of the ring 10 and cover 14. The cover plate 14, which carries the plotting disc assembly, may be secured to the box 13 by means of screws 27 extending through the plate and threaded into the tapped projections 22 on the corners of box 13.

The relatively small size of my improved device is strikingly emphasized in Fig. 5, wherein the device is indicated generally at 30 and is shown superimposed over a conventional type of maneuvering board, indicated at 31, which is well-known in the art and is often used to solve the same navigational problems for which I would use my improved navigational computer described herein.

The operation of my improved device in the solution of the various navigational problems may best be understood by reference to Figs. 1, 6, 7, 8 and 9, wherein the steps incident to the solution of a few well-known problems are illustrated in detail. In order to facilitate an explanation of these problems, a magnetic variation of 15 degrees East is assumed in each of the problems described in detail hereinafter. Hence, in Figs. 1, 6, 7 and 9, a magnetic index 9' is shown as pencil-marked on the drift and variation scale 10' to indicate the magnetic bearings equivalent to the true bearings indicated at the true index 9.

By referring again to Fig. 1, the operation of the device to plot the wind point W with reference to the center 3 of the plotting disc 1 and to the compass rose 8 may be described. Ordinarily, this is the first step in the use of the device and may easily be accomplished by turning the knob 26 to adjust the compass rose to read at the true index 9 the direction from which the wind is blowing, and then plotting the wind arrow straight down the chart center line 7; the length of the wind arrow being measured along the chart center line scale to represent a wind vector drawn to the scale of the polar coordinate chart.

With the wind vector determined, the necessary operations for solving the wind problem for a specified course consist simply in manipulation of the device without any arithmetic work whatever. The solution of this problem is also illustrated in Fig. 1. The first step is to pencil-mark on the compass rose 8 the desired course as, for example, 30°, as shown at 29. The next step is to pencil-mark a magnetic heading index, as, for example, the assumed value of 15° East indicated at 9', on the drift and variation scale 10' to facilitate the reading of magnetic headings equivalent to true headings set at the true heading index. The next manipulation is to turn the lower knob 19 to move the coordinate chart until the correct airspeed coordinate, as for example 175 M. P. H., as read from the speed scale along the chart index line, is directly under the index 3. The next step is to set the plotting disc to read the approximately correct heading at the true heading index and read the drift angles indicated both by the drift and variation scale at the pencil-marked course 29 and also by the polar coordinate radial line at the pencil-marked wind point W. By one or two trials these two drift indications may be adjusted to equal values, after which the required magnetic heading (15°) may be read at the pencil-marked index 9' and the groundspeed (164 M. P. H.) may be obtained from the chart circle passing through the speed scale and the plotted wind point W.

In case it is desired to find the heading and airspeed for a specified course and specified groundspeed, the above method can be amplified to include adjusting the chart to keep the wind point W over the specified groundspeed circle.

If the heading and airspeed are the known factors, these values may be directly set at the proper indices and the unknown track and groundspeed read from the plotted wind point W. Also, drift and groundspeed data obtained in flight may be plotted to mark an unknown wind point. After these methods of operation are well understood the ordinary operator will find that it is sufficient to mark the wind point W with a small cross, or simply a penciled dot.

Referring to Figs. 6 and 7, there is illustrated the operating steps in the use of my instrument to find the wind by the well-known double-drift method. The assumed known data are: drift angles 3° right and 14° right, respectively, on headings magnetic East and magnetic North, respectively, and at airspeeds 250 M. P. H. and 120 M. P. H., respectively. With the magnetic variation of 15° East, as indicated above, the magnetic heading index is pencil-marked, as shown at 9'. The first heading E (magnetic) is set at the magnetic index 9' by turning the knob 26 to obtain the correct angular orientation of the plotting disc 1, and the first airspeed of 250 M. P. H. is set at the speed index 3 by turning the knob 19 to bring the correct air speed circle, marked "1st airspeed", beneath the speed index 3. The first track line 32 is then traced freehand along the radial chart line representing a drift of 3° right. The second track line 33 is then obtained (Fig. 7) by turning the knob 26 until the second heading N (magnetic) is set at the magnetic index 9' and by turning the knob 19 until the second airspeed of 120 M. P. H., marked "2nd airspeed" is set at the speed index 3, after which the track line 33 may be pencil-marked along the radial line 5' corresponding to 14° to the right of the center line 7. The intersection of the two track lines 32 and 33 marks the wind point W. Subsequent track lines plotted in a similar manner should also intersect at the wind point W, provided the wind remains the same. Intersecting groundspeed arcs similarly plotted could be used to mark the wind point.

As the wind changes with time, place, and altitude, the navigator may obviously plot new track lines and groundspeed arcs from time to time from which he may observe the trend of the wind changes and fluctuations and choose the most probable wind value simply by inspecting a mass of data which otherwise would be difficult to analyze and properly correlate. In this connection, it will be noted that the instrument described above permits the recording and use of such data at different airspeeds without replotting any of the accumulated data.

Referring to Figs 8 and 9, there is illustrated the sequence of operating steps incident to the use of my improved device in solving interception problems. The added utility of the device occasioned by the provision of the rectangular coordinate chart (Fig. 4) is clearly shown by the use of the instrument for this purpose.

Fig. 8 shows the first step in the solution of this type of problem. In this case the velocities involved would probably be applied and read as knots rather than M. P. H. After the true wind point has been determined and plotted, as at W, the true course of the ship to be intercepted (60°) is set at the true heading index 9 and the top horizontal line 34 of the rectangular coordinate chart is set under the true wind point W. Then the relative wind point R is plotted vertically below the true wind point W a distance to scale equal to the ship's speed (30 knots). The position of the relative wind point R, as measured with respect to the center of the plotting disc, then represents to scale the speed and direction of the wind with respect to the moving ship.

The second step in the solution of the problem is illustrated in Fig. 9. The airspeed (assumed to be 150 knots) is set at the speed index 3. And the compass rose 8 is rotated until the line of bearing to the ship (E) reads on the drift and variation scale 10' the same angle (13° right) as is shown by the radial coordinate line passing through the relative wind point R.

Following such adjustment of the plotting disc, the required magnetic heading for interception (62°) may be read at the magnetic index 9' and the rate of interception may be determined from the speed arc passing through the point R (142 knots). Also, with this setting of the plotting disc the groundspeed (168 knots) is indicated by the arc passing through the wind point W and the drift (8° right) is given by the radial coordinate line passing through the wind point W. The drift, when applied on the drift and variation scale, gives the track (85°) by inspection.

Fig. 8 also illustrates a further use of my instrument. Assume a navigator to be flying blind through clouds from a known position by dead reckoning, and after half an hour he determines his position by radio, a glimpse of the ground, or some other method. Under these circumstances the navigator could, of course, set his instrument for the heading and airspeed flown, use a map to measure and compute the track and groundspeed made good, and plot the correct wind point in the manner explained above. A simpler method, however, is to measure or estimate the direction of the dead reckoning position with respect to the observed position and set this direction (60° in Fig. 8) at the true index 9. Then by dividing the distance away from the dead reckoning position (15 miles) by the elapsed time (one-half hour), the magnitude of the dead reckoning wind error (30 miles per hour), may be found; and this distance, plotted to scale vertically below the erroneous wind point W, gives the correct wind point (R in Fig. 8).

While I have described what I, at present, consider to be the preferred embodiment of my invention, it will, of course, be understood that I do not wish to be limited thereto since many modifications in the structure may be made, and I contemplate by the appended claims to cover all such modifications as fall within the true spirit and scope of my invention.

What I claim is:

1. A plotting and computing device including a pair of superposed members, the top one of said members being transparent, the lower one of said members having polar coordinate-lines thereon, said members being mounted for translatory movement with respect to each other and for relative angular movement on an axis different from the origin of said polar coordinate-lines, and means for setting the desired angular orientation of said top member with respect to said lower member.

2. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, and means for setting the desired angular orientation of said top member with respect to said lower member.

3. A plotting and computing device including a pair of superposed members, the top one of said members being transparent, the lower of said members having drift lines thereon, said lines being angularly disposed with respect to each other and having a common intersection point, one of said members being rotatable about an axis thereby to permit angular orientation of said top member with respect to said lower member, said members being mounted for relative translatory movement with respect to each other thereby to permit the distance between said axis and said point to be varied, and means for setting the desired angular orientation of said top member with respect to said lower member.

4. A plotting and computing device including a pair of superposed members, the top one of said members being transparent, the lower one of said members having thereon a true index line and a plurality of drift lines angularly disposed with respect to each other, said lines having a common intersection point, one of said members being rotatable about an axis thereby to permit angular orientation of said top member with respect to said lower member, said members being mounted for relative translatory movement with respect to each other thereby to permit said axis to be moved along said index line to vary the distance between said axis and said point, and means for setting the desired angular orientation of said top member with respect to said lower member.

5. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, and means for setting the desired angular orientation of said top member with respect to said lower member.

6. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, means on one of said members for indicating the distance between said axis and said origin, and means for setting the desired angular orientation of said top member with respect to said lower member.

7. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, an arc on said lower member intersecting said polar coordinate-lines and having said origin as a center, and means for setting the desired angular orientation of said top member with respect to said lower member.

8. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, a plurality of equally spaced arcs on said lower member intersecting said polar coordinate-lines and having said origin as a center, and means for setting the desired angular orientation of said top member with respect to said lower member.

9. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, means on one of said members for indicating the distance between said axis and said origin, and means for setting the desired angular orientation of said top member with respect to said lower member.

10. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, an arc on said lower member intersecting said polar coordinate-lines and having said origin as a center, and means for setting the desired angular orientation of said top member with respect to said lower member.

11. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, a plurality of equally spaced arcs on said lower member intersecting said polar coordinate-lines and having said origin as a center, and means for setting the desired angular orientation of said top member with respect to said lower member.

12. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, and a compass rose on said top member for setting the desired angular orientation of said top member with respect to said lower member.

13. A plotting and computing device including a pair of superposed members, the top one of said members being transparent, the lower one of said members having polar coordinate-lines thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, and a compass rose on said top member for setting the desired angular orientation of said top member with respect to said lower member.

14. A plotting and computing device including a pair of superposed members, the top one of said members being transparent and being rotatable about an axis thereby to permit angular orientation thereof with respect to the lower member, said lower member having polar coordinate-lines thereon, said members being mounted for relative translatory movement with respect to each other thereby to permit the distance between said axis and the origin of said polar coordinate-lines to be varied, a compass rose on said top member, and a curved scale having an index, said scale being positioned on said frame in juxtaposition to said compass rose and being graduated for angular measurements on either side of said index.

15. A plotting and computing device including a frame, a pair of superposed members, the top one of said members being transparent and being rotatable about an axis thereby to permit angular orientation thereof with respect to the lower member, said lower member having polar coordinate-lines thereon, said members being mounted for relative translatory movement with respect to each other thereby to permit said axis to be moved along one of said polar coordinate-lines to vary the distance between said axis and the origin of said coordinate-lines, a compass rose on said top member, and a curved scale having an index thereon, said scale being positioned on said frame in juxtaposition to said compass rose and being graduated for angular measurements on either side of said index.

16. A plotting and computing device including a pair of superposed members, the top one of said members being transparent, the lower one of said members having polar coordinate-lines and a grid chart thereon, one of said members being rotatable about an axis thereby to permit angular orientation of said top member with respect to said lower member, said members being mounted for relative translatory movement with respect to each other thereby to permit the distance between said axis and the origin of said polar coordinate-lines to be varied, and means for setting the desired angular orientation of said top member with respect to said lower member.

17. A plotting and computing device including a pair of superposed members, the top one of said members being transparent, the lower one of said members having polar coordinate-lines and a grid chart thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, and means for setting the desired angular orientation of said top member with respect to said lower member.

18. A plotting and computing device including a pair of superposed members, the top one of said members being transparent, the lower one of said members having polar coordinate-lines and a grid chart thereon, one of said members being rotatable about an axis thereby to permit angular orientation of said top member with respect to said lower member, said members being mounted for relative translatory movement with respect to each other thereby to permit said axis to be moved along one of said polar coordinate-lines to vary the distance between said axis and the origin of said coordinate-lines, means on one of said members for indicating the distance between said axis and said origin, and means for setting the desired angular orientation of said top member with respect to said lower member.

19. A plotting and computing device including a frame, a pair of superposed members mounted on said frame, the top one of said members being transparent and being rotatable in said frame about an axis, the lower one of said members having polar coordinate-lines thereon and being mounted for translatory movement with respect to said top member thereby to permit said axis to be moved along one of said polar coordinate-lines to vary the distance between said axis and the origin of said coordinate-lines, a compass rose on said top member, and a curved scale having an index thereon, said scale being mounted on said frame in juxtaposition to said rose and being graduated for angular measurements on either side of said index.

20. A plotting and computing device comprising a box, a pair of rollers mounted within said box and having their axes of rotation substantially parallel, an endless belt extending between said rollers, said belt having polar coordinate-lines and a grid chart delineated on the outer surface thereof, means for maintaining said belt taut, a detachable cover for said box having a circular opening therein over said belt, means whereby one of said rollers may be rotated thereby to move the exposed upper surface of said belt under said opening, a transparent disc rotatably mounted on said cover and extending over said opening, the axis of rotation of said disc being coincident with a predetermined polar coordinate-line for any position of said belt, a compass rose on said disc, and a curved scale having an index and mounted on said cover in juxtaposition to said compass rose, said scale being graduated for angular measurements on either side of said index.

21. A navigational plotting and computing device including a pair of superimposed members, the top one of said members being transparent, the lower one of said members being relatively long and narrow and having a heading line delineated lengthwise thereon, a series of drift lines converging with said heading line at angles up to a maximum of approximately 50°, said members being mounted for translatory movement with respect to each other and for relative angular movement on an axis different from the intersection point of said drift lines with said heading line, and means for setting the desired angular orientation of the top member with respect to said lower member.

PHILIP DALTON.